United States Patent [19]

Chateau

[11] 4,082,490
[45] Apr. 4, 1978

[54] APPARATUS FOR MOLDING A TIRE MOLDING BLADDER

[75] Inventor: Jacques Chateau, Chatel-Guyon, France

[73] Assignee: Compagnie Generale des Etablissements Michelin, Clermont-Ferrand, France

[21] Appl. No.: 753,606

[22] Filed: Dec. 22, 1976

[30] Foreign Application Priority Data

Jan. 2, 1976 France .................................. 76 00047

[51] Int. Cl.² ........................ B29C 17/00; B29H 5/18; B29C 3/00
[52] U.S. Cl. ..................................... 425/412; 425/52; 425/398; 425/547
[58] Field of Search ..................... 425/50, 51, 52, 384, 425/394, 398, 407, 542, 544, 547, 412

[56] References Cited

U.S. PATENT DOCUMENTS

| 2,929,101 | 3/1960 | Davis | 425/394 X |
| 2,959,817 | 11/1960 | Bank | 425/394 X |
| 3,543,337 | 12/1970 | Meyn | 425/547 X |
| 4,025,269 | 9/1977 | Reinders | 425/544 X |

*Primary Examiner*—J. Howard Flint, Jr.
*Attorney, Agent, or Firm*—Brumbaugh, Graves, Donohue & Raymond

[57] ABSTRACT

A bladder for use in a tire molding and vulcanization press has grooves in its outer face and a circumferential molding flash on its inner face. A process for the manufacture of this membrane by molding uses a press having a ribbed core to produce the grooves and two shells which may have smooth walls.

3 Claims, 6 Drawing Figures

APPARATUS FOR MOLDING A TIRE MOLDING BLADDER

The present invention relates to improvements, on the one hand, in expandable elastic hollow bodies, called bladders, which are employed in the presses for the molding and vulcanizing of tires for vehicle wheels, and, on the other hand, in the presses used in order to manufacture these elastic bladders.

The essential elements of a tire molding and vulcanizing press are the mold and the bladder. The mold is an assembly of rigid parts, generally of metal, which are movable with respect to each other. This assembly is intended to impart the outer shape to the beads, to the sidewalls and to the tread of the tire. The bladder is an elastic element, generally of vulcanized rubber. This bladder is intended to impart the desired shape to the inside of the tire and to apply the tire against the mold. The bladder is in the form of a hollow body of revolution whose axis of revolution coincides with that of the tire. The two axial ends of the bladder are fastened to terminal metallic elements so as to form a tight enclosure with the inside of the bladder. The terminal metallic elements are movable in axial direction and, prior to the molding and vulcanization of the tire, form an assembly with the bladder which permits passage of the beads of the tire. This is in order to permit the placing of the unvulcanized tire in the mold of the tire molding and vulcanization press.

Once this tire has been put in place, the axial movement towards each other of the two terminal metallic elements and the inflation of the elastic bladder by means of a fluid under pressure impact to the elastic bladder a toroidal shape corresponding to that which it is desired to impart to the inside of the tire. The pressure exerted by the bladder on the tire in the direction of the mold also permits the molding of the outer wall of the tire to the desired shape.

When the outer face of the bladder is applied during the molding against the inner wall of the tire, it is advisable to avoid any retention of air between the bladder and the tire. For this purpose, the bladder bears ribs which are separated by grooves on its outer face which is intended to enter into contact with the tire. These grooves of the bladder are directed in such a manner as to channel the air from the crown of the tire towards the beads and are formed during the manufacture of the bladder, and particularly during the molding of the latter.

In order to manufacture a bladder, a rubber sleeve is first of all produced by transfer molding between the core and the two shells of a bladder molding and vulcanizing press. The core is located on the inside of the sleeve so as to impart to the bladder its internal shape, while the two shells are placed on the outside of the rubber sleeve and adjoin each other along a junction surface which is transverse with respect to the axis of the sleeve, so as to impart to the bladder its outer shape.

Ordinarily the outside of the core of the press is smooth and the inner walls of the two shells bear, in relief, ribs intended to mold the above-described grooves in the outer face of the bladder. The following disadvantages result from this.

On the one hand, the machining of the ribs on the inner walls of the shells is complicated, particularly when the bladders are intended for the manufacture of radial tires. In this case, the ribs must be arranged obliquely with respect to the meridian lines of the bladder in order to avoid defects in the manufacture of the tires. On the other hand, it is necessary to eliminate the flash of rubber which results from the flow of the rubber along the junction of the shells in order to prevent this flash from being pressed into the inner covering of the tire, particularly in the case of tubeless tires. Ordinarily, the flash is removed by grinding. This causes damage to the surface of the bladder near its equator, that is to say incipient tears in the zone where the bladder is subjected to the greater stress during the molding of the tire.

The object of the present invention is to avoid the drawbacks described above. For this purpose, it relates on the one hand, to a sleeve press for the molding and vulcanization of sleeve which are invertible into resulting elastic bladder and, on the other hand, to a process for the manufacture of such elastic bladders, and finally to the elastic bladders themselves manufactured with that press and by that process.

The sleeve press in accordance with the invention has a core whose outer wall is intended to mold the inside of the invertible rubber sleeve and two shells whose inner walls are intended to mold the outside of the sleeve and is characterized by the fact that the outer wall of the core has raised elements in relief.

The apparatus for performing the process in accordance with the invention, which comprises placing a mass of vulcanizable rubber in the above described sleeve press in such a manner that the mass is molded into the invertible sleeve shape by transfer between the core and the two shells and is then vulcanized, is characterized by the fact that the invertible sleeve is removed from the sleeve press and is inverted or turned inside out, like a sock, so that the inner face of the invertible sleeve becomes the outer face of the resulting elastic bladder.

The elastic bladder of vulcanized rubber in accordance with the invention is characterized by the fact that its outer face has recessed elements for channeling the air and its inner face has a circumferential molding flash. This flash comes from the junction of the two shells of the sleeve press described above which served for the manufacture of the intermediate invertible sleeve.

The sleeve press in accordance with the invention has the advantage of a low cost. As a matter of fact, the machining of elements in relief on the outer wall of the core is easier than on the inner wall of the shells. This outer wall generally has the shape of two conical frusta connected at their large bases by means of a cylindrical portion of diameter equal to that of the large bases.

Th apparatus for performing the process in accordance with the invention though it is as simple as the known process, makes it possible to eliminate the operation of grinding the molding flash and, therefore, to avoid the drawbacks which result from using such a ground bladder.

The description of embodiments illustrated in the drawing is not limitative and it is intended essentially to facilitate an understanding of the invention.

Figure 1:
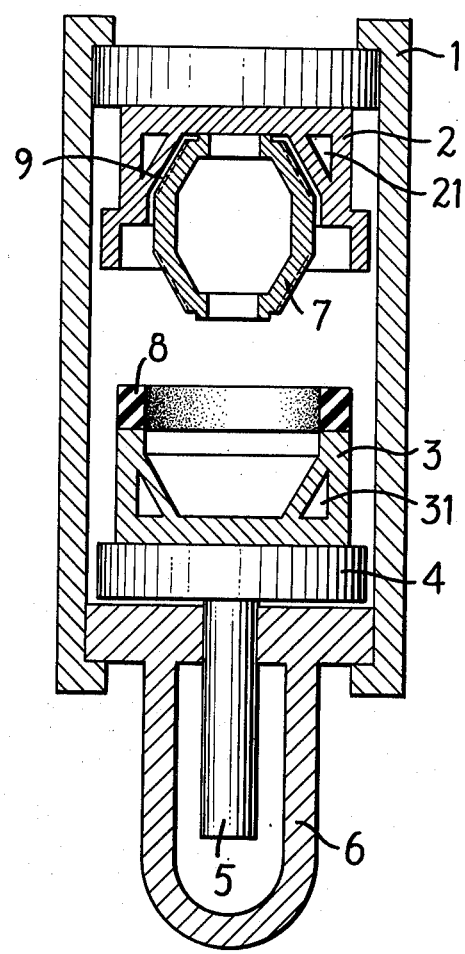
FIG. 1 shows schematically a sleeve press of the invention for the molding and vulcanizing of an invertible sleeve, the press being open.
Figure 2:
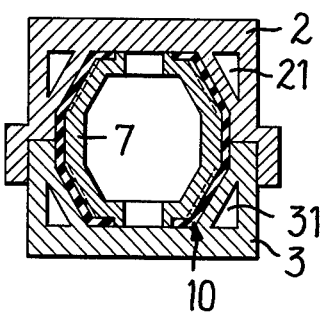
FIG. 2 shows the two shells of the sleeve press of FIG. 1, in closed position.
Figure 3:
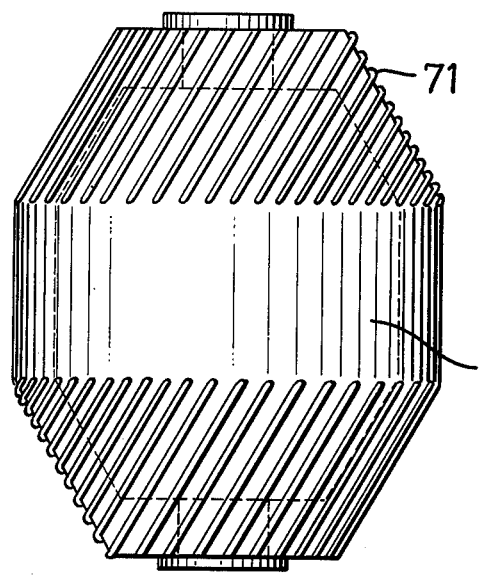
FIG. 3 shows the core of the sleeve press provided with raised elements in relief.
Figure 4:
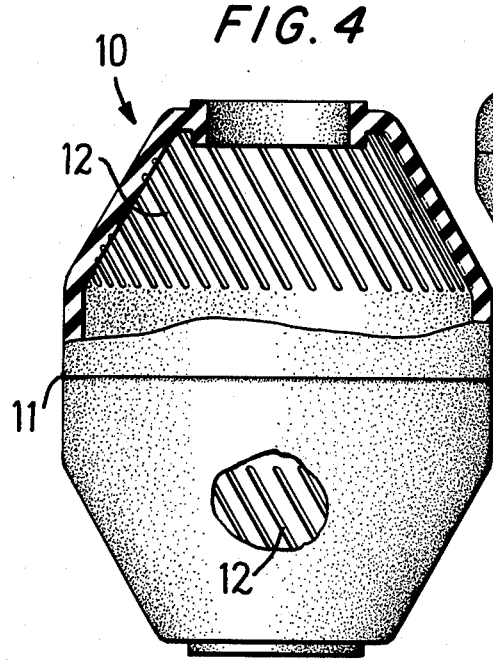
FIG. 4 shows, partly broken away, an invertible sleeve.

The sleeve press for the manufacture of invertible sleeves which has been shown schematically in FIG. 1 comprises a frame 1 at the top of which there is held an upper shell 2 which is open downward in the direction towards the lower shell 3 which is fastened on a plate 4 which is associated with a rod 5 forming a piston guided in the cylinder 6 having an inlet connection and an outlet connection for a fluid under pressure (not shown). When the press is open, that is to say in the position shown in FIG. 1, the core 7 is centrally fastened in one of the shells, for example in the upper shell 2. In accordance with the invention, this core is provided on its outer wall with raised elements in relief, in this case ribs 71 (FIG. 3), over at least a portion of its extent. Also in accordance with the invention, the inner walls of the two shells 2 and 3 may be without elements in relief, i.e., may be smooth. A mass of vulcanizable rubber 8 of annular shape is placed on the lower shell 3. By passing fluid under pressure into the cylinder 6, the plate 4 is caused to rise, and therefore also the lower shell 3 and the mass 8, until the two shells 2 and 3 are completely closed, as shown in FIG. 2. This closing causes the transfer of the mass 8 into the space 9 between the inner walls of the two shells and the outer wall of the core 7, so as to form the invertible sleeve 10. The shells 2 and 3 each have a channel 21 and 31 in which a hot fluid may circulate in order to vulcanize the rubber constituting the invertible sleeve 10. When this vulcanization is finished, the sleeve press is opened and the core 7 bearing the invertible sleeve 10 is removed therefrom. The outer face of this sleeve 10 shown in FIG. 4 has a circumferential molding flash 11 corresponding to the joint 23 present at the interface of the closed shells 2 and 3 (FIG. 2), while the inner face of the sleeve has recessed elements 12 corresponding to the raised relief elements 71 of the core 7.

Figure 5:
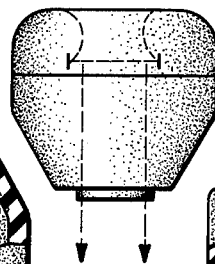
FIG. 5 shows the invertible sleeve partially inverted into a resulting elastic bladder.
Figure 6:
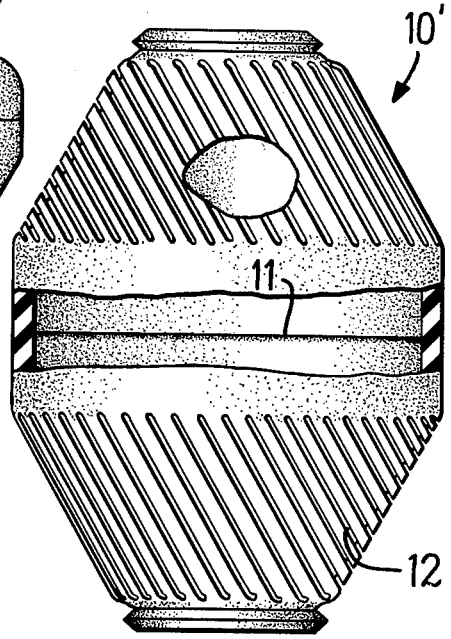
FIG. 6 shows, partly broken away, the resulting elastic bladder of the invention.

In order to reverse this arrangement, it is sufficient to turn the invertible sleeve 10 inside out as shown in FIG. 5., in the same way, for instance, as one turns a sock inside out. This having been done, the tire molding and vulcanizing bladder 10' has the appearance shown in FIG. 6; the molding flash 11 is on the inner face and the recessed elements 12 are on the outer face. This elastic bladder can then be used in customary manner in a tire molding and vulcanizing press, such as that described, for instance, in U.S. Pat. No. 2,736,059.

Preferably, the raised relief elements 71 provided on the core 7 are ribs (linear or other) creating grooves 12 in the sleeve 10 and in the bladder 10'. The length, the spacing, the contour, and the height of these relief elements are without importance for carrying out the invention.

I claim:

1. A press for manufacturing a sleeve which is invertible into a resulting elastic bladder for use in a tire molding and vulcanization press, said sleeve press having a core and two shells which can be joined to each other, characterized by the fact that the outer wall of the core has raised elements in relief for producing recessed elements in the inner face of the invertible sleeve.

2. The sleeve press according to claim 1, characterized by the fact that the inner walls of the two shells are smooth.

3. The sleeve press according to claim 1, characterized by the fact that the raised elements in relief on the outer wall of the core are ribs.

* * * * *